(12) United States Patent
Abdelilah et al.

(10) Patent No.: US 6,754,258 B1
(45) Date of Patent: Jun. 22, 2004

(54) SYSTEMS, METHODS AND COMPUTER PROGRAM PRODUCTS FOR AVERAGING LEARNED LEVELS IN THE PRESENCE OF DIGITAL IMPAIRMENTS BASED ON PATTERNS

(75) Inventors: Youssef Abdelilah, Holly Springs, NC (US); Gordon Taylor Davis, Chapel Hill, NC (US); Dongming Hwang, Cary, NC (US); Malcolm Scott Ware, Raleigh, NC (US); Hua Ye, Durham, NC (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/431,564

(22) Filed: Oct. 29, 1999

(51) Int. Cl.[7] .............................................. H04L 5/16
(52) U.S. Cl. .................. 375/220; 375/222; 375/243; 375/254; 375/346; 370/252; 455/63; 455/67.1; 455/296
(58) Field of Search ................................ 375/220, 222, 375/242, 243, 254, 257, 285, 296, 340, 346; 455/63, 67.1, 67.3, 296; 370/201, 252, 342, 509

(56) References Cited

U.S. PATENT DOCUMENTS

| | | | |
|---|---|---|---|
| 3,557,308 A | 1/1971 | Alexander et al. | 178/69.5 |
| 3,622,877 A | 11/1971 | MacDavid et al. | 324/73 R |
| 3,683,120 A | 8/1972 | Schenkel | 179/15 A |
| 3,729,717 A | 4/1973 | de Koe et al. | 340/172.5 |
| 4,112,427 A | 9/1978 | Hofer et al. | 340/347 |
| 4,132,242 A | 1/1979 | Carroll, Jr. | 137/263 |
| 4,208,630 A | 6/1980 | Martinez | 375/7 |
| 4,237,552 A | 12/1980 | Aikoh et al. | 370/83 |

(List continued on next page.)

FOREIGN PATENT DOCUMENTS

| | | | |
|---|---|---|---|
| EP | 0 473 116 A2 | 8/1991 | ............ H04N/1/00 |
| EP | 0 659 007 A2 | 11/1994 | .......... H04M/11/06 |
| EP | 0 669 740 A2 | 12/1994 | .......... H04L/27/00 |
| FR | 2 345 019 | 3/1976 | .......... H04L/27/10 |
| WO | WO 96/18261 | 6/1996 | .......... H04M/11/00 |
| WO | WO 98/37657 | 8/1998 | |

OTHER PUBLICATIONS

Barlet, J., et al., *Full Speed Recovery in High Speed Modems*, IBM Technical Disclosure Bulletin, vol. 23, No. 2, pp. 641–643 (Jul. 1980).

(List continued on next page.)

*Primary Examiner*—Stephen Chin
*Assistant Examiner*—Dac V. Ha
(74) *Attorney, Agent, or Firm*—Scott W. Reid; Myers Bigel Sibley & Sajovec, P.A.

(57) ABSTRACT

Methods, systems and computer program products for averaging measured levels from differing frame intervals based on a digital impairment pattern associated with the frame intervals are provided. Measured levels from frame intervals with the same digital impairment pattern may be averaged together and the measured levels replaced with the average. By averaging frame intervals based on a digital impairment pattern, the present invention may reduce the impact of noise by increasing the signal to noise ratio of the levels utilized for constellation generation. The use of the digital impairment patterns for determining which frame intervals to average may reduce the likelihood that digital impairments will corrupt the average by, for example, collapsing measured levels from one code point onto another code point. If the frame intervals have the same digital impairment pattern then it is likely that the differences in the values of the in the measured levels of the frame intervals are the result of random noise rather than digital impairments and, therefore, may be averaged together to reduce the impact of the random noise.

21 Claims, 5 Drawing Sheets

U.S. PATENT DOCUMENTS

| | | | |
|---|---|---|---|
| 4,270,027 A | 5/1981 | Agrawal et al. | 179/81 R |
| 4,434,322 A | 2/1984 | Ferrell | 178/22.13 |
| 4,450,556 A | 5/1984 | Boleda et al. | 370/58 |
| 4,577,310 A | 3/1986 | Korsky et al. | 370/58 |
| 4,578,796 A | 3/1986 | Charalambous et al. | 375/8 |
| 4,720,861 A | 1/1988 | Bertrand | 381/36 |
| 4,731,816 A | 3/1988 | Hughes-Hartogs | 379/98 |
| 4,756,007 A | 7/1988 | Qureshi et al. | 375/37 |
| 4,760,598 A | 7/1988 | Ferrell | 380/44 |
| 4,797,898 A | 1/1989 | Martinez | 375/7 |
| 4,833,706 A | 5/1989 | Hughes-Hartogs | 379/98 |
| 4,868,863 A | 9/1989 | Hartley et al. | 379/98 |
| 4,884,285 A | 11/1989 | Heynen et al. | 375/25 |
| 4,890,303 A | 12/1989 | Bader | 375/107 |
| 4,890,316 A | 12/1989 | Walsh et al. | 379/98 |
| 4,894,847 A | 1/1990 | Tjahjadi et al. | 375/121 |
| 4,901,333 A | 2/1990 | Hodgkiss | 375/98 |
| 4,943,980 A | 7/1990 | Dobson et al. | 375/42 |
| 4,953,210 A | 8/1990 | McGlynn et al. | 380/48 |
| 4,967,413 A | 10/1990 | Otani | 371/37.4 |
| 4,972,360 A | 11/1990 | Cuckier et al. | 364/724.04 |
| 4,985,902 A | 1/1991 | Gurcan | 375/14 |
| 4,991,169 A | 2/1991 | Davis et al. | 370/77 |
| 4,995,030 A | 2/1991 | Helf | 370/32.1 |
| 5,005,144 A | 4/1991 | Nakajima et al. | 364/565 |
| 5,007,047 A | 4/1991 | Sridhar et al. | 370/32.1 |
| 5,014,299 A | 5/1991 | Klupt et al. | 379/98 |
| 5,033,062 A | 7/1991 | Morrow et al. | 375/7 |
| 5,038,365 A | 8/1991 | Belloc et al. | 375/8 |
| 5,040,190 A | 8/1991 | Smith et al. | 375/4 |
| 5,052,000 A | 9/1991 | Wang et al. | 371/43 |
| 5,058,134 A | 10/1991 | Chevillat et al. | 375/39 |
| 5,065,410 A | 11/1991 | Yoshida et al. | 375/98 |
| 5,067,125 A | 11/1991 | Tsuchida | 370/79 |
| 5,068,875 A | 11/1991 | Quintin | 375/78 |
| 5,107,520 A | 4/1992 | Karam et al. | 375/60 |
| 5,111,481 A | 5/1992 | Chen et al. | 375/14 |
| 5,119,401 A | 6/1992 | Tsujimoto | 375/14 |
| 5,119,403 A | 6/1992 | Krishnan | 375/39 |
| 5,134,611 A | 7/1992 | Steinka et al. | 370/79 |
| 5,142,552 A | 8/1992 | Tzeng et al. | 375/14 |
| 5,157,690 A | 10/1992 | Buttle | 375/14 |
| 5,187,732 A | 2/1993 | Suzuki | 379/5 |
| 5,210,755 A | 5/1993 | Nagler et al. | 370/108 |
| 5,225,997 A | 7/1993 | Lederer et al. | 364/550 |
| 5,253,272 A | 10/1993 | Jaeger et al. | 375/60 |
| 5,253,291 A | 10/1993 | Naseer et al. | 379/406 |
| 5,265,151 A | 11/1993 | Goldstein | 379/97 |
| 5,285,474 A | 2/1994 | Chow et al. | 375/13 |
| 5,291,479 A | 3/1994 | Vaziri et al. | 370/58.2 |
| 5,311,578 A | 5/1994 | Bremer et al. | 379/97 |
| 5,317,594 A | 5/1994 | Goldstein | 375/8 |
| 5,351,134 A | 9/1994 | Yaguchi et al. | 358/435 |
| 5,353,280 A | 10/1994 | Ungerböck | 370/32.1 |
| 5,386,438 A | 1/1995 | England | 375/121 |
| 5,394,110 A | 2/1995 | Mizoguchi | 329/304 |
| 5,394,437 A | 2/1995 | Ayanoglu et al. | 375/222 |
| 5,398,303 A | 3/1995 | Tanaka | 395/51 |
| 5,402,445 A | 3/1995 | Matsuura | 375/229 |
| 5,406,583 A | 4/1995 | Dagdeviren | 375/5 |
| 5,418,842 A | 5/1995 | Cooper | 379/98 |
| 5,432,794 A | 7/1995 | Yaguchi | 371/5.5 |
| 5,434,884 A | 7/1995 | Rushing et al. | 375/235 |
| 5,475,711 A | 12/1995 | Betts et al. | 375/240 |
| 5,491,720 A | 2/1996 | Davis et al. | 375/222 |
| 5,513,216 A | 4/1996 | Gadot et al. | 375/233 |
| 5,519,703 A | 5/1996 | Chauffour et al. | 370/84 |
| 5,528,625 A | 6/1996 | Ayanoglu et al. | 375/222 |
| 5,528,679 A | 6/1996 | Taarud | 379/34 |
| 5,533,048 A | 7/1996 | Dolan | 375/222 |
| 5,534,913 A | 7/1996 | Majeti et al. | 348/7 |
| 5,546,395 A | 8/1996 | Sharma et al. | 370/84 |
| 5,563,908 A | 10/1996 | Kaku et al. | 375/222 |
| 5,566,211 A | 10/1996 | Choi | 375/332 |
| 5,598,401 A | 1/1997 | Blackwell et al. | 379/94 |
| 5,625,643 A | 4/1997 | Kaku et al. | 375/222 |
| 5,634,022 A | 5/1997 | Crouse et al. | 395/704 |
| 5,640,387 A | 6/1997 | Takahashi et al. | 370/359 |
| 5,646,958 A | 7/1997 | Tsujimoto | 375/233 |
| 5,671,250 A | 9/1997 | Bremer et al. | 375/222 |
| 5,694,420 A | 12/1997 | Ohki et al. | 375/222 |
| 5,710,792 A | 1/1998 | Fukawa et al. | 375/229 |
| 5,724,393 A | 3/1998 | Dagdeviren | 375/296 |
| 5,726,765 A | 3/1998 | Yoshida et al. | 358/412 |
| 5,729,226 A | 3/1998 | Betts et al. | 341/94 |
| 5,732,104 A | 3/1998 | Brown et al. | 375/222 |
| 5,734,663 A | 3/1998 | Eggenberger | 371/39.1 |
| 5,751,717 A | 5/1998 | Babu et al. | 370/466 |
| 5,751,796 A | 5/1998 | Scott et al. | 379/93.31 |
| 5,754,594 A | 5/1998 | Betts et al. | 375/285 |
| 5,757,849 A | 5/1998 | Gelblum et al. | 375/222 |
| 5,757,865 A | 5/1998 | Kaku et al. | 375/344 |
| 5,761,247 A | 6/1998 | Betts et al. | 375/316 |
| 5,768,311 A | 6/1998 | Betts et al. | 375/222 |
| 5,778,024 A | 7/1998 | McDonough | 375/216 |
| 5,784,377 A | 7/1998 | Baydar et al. | 370/463 |
| 5,784,405 A | 7/1998 | Betts et al. | 375/222 |
| 5,784,415 A | 7/1998 | Chevillat et al. | 375/341 |
| 5,793,809 A | 8/1998 | Holmquist | 375/242 |
| 5,796,808 A | 8/1998 | Scott et al. | 379/93.31 |
| 5,801,695 A | 9/1998 | Townshend | 375/340 |
| 5,805,669 A | 9/1998 | Bingel et al. | 379/28 |
| 5,809,075 A | 9/1998 | Townshend | 375/254 |
| 5,812,537 A | 9/1998 | Betts et al. | 370/286 |
| 5,815,534 A | 9/1998 | Glass | 375/326 |
| 5,822,371 A | 10/1998 | Goldstein et al. | 375/242 |
| 5,825,816 A | 10/1998 | Cole et al. | 375/222 |
| 5,825,823 A | 10/1998 | Goldstein et al. | 375/286 |
| 5,831,561 A | 11/1998 | Cai et al. | 341/106 |
| 5,835,532 A | 11/1998 | Strolle et al. | 375/233 |
| 5,835,538 A | 11/1998 | Townshend | 375/295 |
| 5,838,724 A | 11/1998 | Cole et al. | 375/222 |
| 5,839,053 A | 11/1998 | Bosch et al. | 455/13.1 |
| 5,844,940 A | 12/1998 | Goodson et al. | 375/222 |
| 5,850,388 A | 12/1998 | Anderson et al. | 370/252 |
| 5,850,421 A | 12/1998 | Misra et al. | 375/354 |
| 5,852,631 A | 12/1998 | Scott | 375/222 |
| 5,862,141 A | 1/1999 | Trotter | 370/468 |
| 5,862,179 A | 1/1999 | Goldstein et al. | 375/242 |
| 5,862,184 A | 1/1999 | Goldstein et al. | 375/295 |
| 5,870,429 A | 2/1999 | Moran, III et al. | 375/222 |
| 5,872,817 A | 2/1999 | Wei | 375/341 |
| 5,881,066 A | 3/1999 | Lepitre | 371/20.5 |
| 5,881,102 A | 3/1999 | Samson | 375/222 |
| 5,887,027 A | 3/1999 | Cohen et al. | 375/222 |
| 5,911,115 A | 6/1999 | Nair et al. | 455/63 |
| 5,914,982 A | 6/1999 | Bjarnason et al. | 375/222 |
| 5,918,204 A | 6/1999 | Tsurumaru | 704/214 |
| 5,926,506 A | 7/1999 | Berthold et al. | 375/222 |
| 6,115,395 A * | 9/2000 | Norrell et al. | 370/250 |
| 6,212,207 B1 * | 4/2001 | Nicholas | 370/523 |
| 6,301,296 B1 * | 10/2001 | Krishnan et al. | 375/222 |
| 6,370,124 B1 * | 4/2002 | Lai | 370/292 |
| 6,404,809 B1 * | 6/2002 | Zhang | 370/286 |
| 6,512,787 B1 * | 1/2003 | Tung et al. | 375/222 |
| 6,553,074 B1 * | 4/2003 | Shalvi et al. | 375/242 |
| 6,650,657 B1 * | 11/2003 | Abdelilah et al. | 370/474 |

OTHER PUBLICATIONS

Dialog Abstract, *Sample rate converter for duplex modem*, European Patent No. 285413.

Dialog Abstract, *Two–speed full–duplex modem for telephone network*, PCT No. WO 8501407.

Dialog Abstract, *Digital date transmission system*, European Patent No. 124674.

Dialog Abstract, *Facsimile communication controller*, Japanese Publication No. 04–175060 (Jun. 23, 1992).

Dialog Abstract, *Picture communication equipment*, Japanese Publication No. 03–120954 (May 23, 1991).

Dialog Abstract, *Radio date transmission system*, Japanese Publication No. 01–179535 (Jul. 17, 1989).

Dialog Abstract, *Facsimile device*, Japanese Publication No. 57–164654 (Oct. 9, 1982).

Dialog Abstract, *Data repeater*, Japanese Publication No. 57–087255 (May 31, 1982).

Dialog Abstract, *Blinding training method for decision feedback equaliser having feed–forward and feedback filters*, European Patent No. 880253.

Dialog Abstract, *Processing method for distorted signal received by qam receiver*, European Patent No. 465851.

Dialog Abstract, *Establishing wireless communication channel*, PCT No. WO 9905820.

Dialog Abstract, *High–speed rate adaptive subscriber line digital data modem*, PCT No. WO 9830001.

Dialog Abstract, *Digital modem in digital modulation system*, Japanese Patent No. 8116341.

Dialog Abstract, *Communication equipment and radio communication adapter*, Japanese Publication No. 08–340289 (Dec. 24, 1996).

Dialog Abstract, *Data recording method*, Japanese Publication No. 05–089597 (Apr. 9, 1993).

Dialog Abstract, *Transmission control system for data communication and its modem equipment*, Japanese Publication No. 02–228853 (Sep. 11, 1990).

Naguib, A.F., et al., Dialog Abstract, *A space–time coding modem for high–data–rate wireless communications*, IEEE Journal of Selected Areas in Communications, vol. 16, No. 8, pp. 1459–1478 (Oct. 1998).

Denno, S., et al., Dialog Abstract, *Mbit/s burst modem with an adaptive equalizer for TDMA mobile radio communications*, IEICE Transactions on Communications, vol. E81–B, No. 7, pp. 1453–1461 (Jul. 1998).

Naguib, A.F., et al., Dialog Abstract, *A space–time coding modem for high–data–rate wireless communications*, GLOBECOM 97, IEEE Global Telecommunications Conference, vol. 1, pp. 102–109 (1997).

Kobayashi, K., et al., Dialog Abstract, *Fully digital burst modem for satellite multimedia communication systems*, IEICE Transactions on Communications, vol. E80–B, No. 1, pp. 8–15 (Jan. 1997).

Skellern, D.J., et al., Dialog Abstract, *A high speed wireless LAN*, IEEE Micro, vol. 17, No. 1, pp. 40–47 (Jan.–Feb. 1997).

Enomoto, K., et al., Dialog Abstract, *A mode switching type burst demodulator AFC*, Transactions of the Institute of Electronics, Information and Communication Engineers, vol. J76B–II, No. 5, pp. 415–421 (May 1993).

Betts, W., Dialog Abstracts, *Nonlinear encoding by surface projection*, International Conference on Data Transmission—Advances in Modem and ISDN Technology and Applications (Sep. 23–25, 1992).

Schilling, D.L., et al., Dialog Abstract, *The FAVR meteor burst communication experiment*, Military Communications in a Changing World MILCOM '91 (Nov. 4–7, 1991).

Jacobsmeyer, J.M., Dialog Abstract, *Adaptive trellis–coded modulation for bandlimited meteor burst channels*, IEEE Journal on Selected Areas in Communications, vol. 10, No. 3, pp. 550–561 (Apr. 1992).

Sato, T., et al., Dialog Abstract, *Protocol configuration and verification of an adaptive error control scheme over analog cellular networks*, IEEE Transactions on Vehicular Technology, vol. 41, No. 1, pp. 69–76 (Feb. 1992).

Lee, L.–N., et al., Dialog Abstract, *Digital signal processor–based programmable BPSK/QPSK/offset–QPSK modems*, COMCAST Technical Review, pp. 195–234 (Full 1989).

Sato, T., et al., Dialog Abstract, *Error–free high–speed data modem*, Oki Technical Review, vol. 56, No. 133, pp. 20–26 (Apr. 1989).

Seo, J.–S, et al., Dialog Abstract, *Performance of convolutional coded SQAM in hardlimited satellite channels*, IEEE International Conference on Communications BOSTON-ICC/89, vol. 2, pp. 787–791 (Jun. 11–14, 1989).

Murakama, K., et al., Dialog Abstract, *FEC combined burst–modem for business satellite communications use*, IEEE/IECE Global Telecommunications Conference 1987, vol. 1, pp. 274–280 (Japan, Nov. 15–18, 1987).

McVerry, F., Dialog Abstract, *Performance of a fast carrier recovery scheme for burst–format DQPSK transmission over satellite channels*, International Conference on Digital Processing of Signals in Communications, pp. 165–172 (United Kingdom, 1985).

Filter, J.H.J., Dialog Abstract, *An algorithm for detecting loss of synchronisation in data transmission test sets (modems)*, Transactions of the South African Institute of Electrical Engineers, vol. 76, No. 1, pp. 39–43 (Jan. 1985).

Gersho, A., Dialog Abstract, *Reduced complexity implementation of passband adaptive equalizers*, IEEE Journal on Selected Areas in Communications, vol. SAC–2, No. 5, pp. 778–779 (Sep. 1984).

Dialog Abstract, *High–speed full–duplex modem reduces telephone connect time*, EDN, vol. 27, No. 18, p. 77 (Sep. 15, 1982).

Chadwick, H., et al., Dialog Abstract, *Performance of a TDMA burst modem through a dual nonlinear satellite channel*, Fifth International Conference on Digital Satellite Communications, pp. 63–67 (Italy, Mar. 23–26, 1981).

Nussbaumer, H., Dialog Abstract, *Reducing the acquisition time in an automatic equalizer*, IBM Technical Disclosure Bulletin, vol. 18, No. 5, pp. 1465–1479 (Oct. 1975).

Uzunoglu, V., et al., Dialog Abstract, *Synchronous and the coherent phase–locked synchronous oscillators: new techniques in synchronization and tracking*, IEEE Transactions on Circuits and Systems, vol. 36, No. 7, pp. 997–1004 (Jul. 1989).

Minei, I., et al., Dialog Abstract, *High–speed Internet access through unidirectional geostationary satellite channels*, IEEE Journal on Selected Areas in Communications, vol. 17, No. 2, pp. 345–359 (Feb. 1999).

Ovadia, S., Dialog Abstract, *The effect of interleaver depth and QAM channel frequency offset on the performance of multichannel AM–VSB/256–QAM video lightwave transmission systems*, International Conference on Telecommunications: Bridging East and West Through Communications, vol. 1, pp. 339–343 (Greece, Jun. 21–25, 1998).

Johnson, R.W., et al., Dialog Abstract, *Error correction coding for serial–tone HG transmission*, Seventh International Conference on HF Radio Systems and Techniques, pp. 80–84 (United Kingdom, Jul. 7–10, 1997).

Karasawa, Y., et al., Dialog Abstract, *Cycle slip in clock recovery on frequency–selective fading channels*, IEEE Transactions on Communications, vol. 45, No. 3, pp. 376–383 (Mach 1997).

Umehira, M.,et al., Dialog Abstract, *Design and performance of burst carrier recovery using a phase compensated filter*, Transactions of the Institute of Electronics, Information and Communication Engineers, vol. J78B–II, No. 12, pp. 735–746 (Dec. 1995).

De Bot, P., et al., Dialog Abstract, *An example of a multi–resolution digital terrestrial TV modem*, Proceedings of ICC '93—IEEE International Conference on Communications, vol. 3, pp. 1785–1790 (Switzerland, May 23–26, 1993).

Lei, Chen, et al., Dialog Abstract, *Single–tone HF high speed data modem*, Proceedings of TENCON '93—IEEE Region 10 International Conference on Computers, Communications and Automation, vol. 3, pp. 94–98 (China, Oct. 19–21, 1993).

Woerner, B.D., et al., Dialog Abstract, *Simulation issues for future wireless modems*, IEEE Communications, vol. 32, No. 7, pp. 42–53 (Jul. 1994).

Sato, T., et al., Dialog Abstract, *Vehicle terminal equipment with dedicated DSP*, Oki Technical Review, vol. 58, No. 144, pp. 49–52 (Jul. 1992).

Tamm, Yu.A., Dialog Abstract, *The effect of suppressing harmonic interference using an adaptive equalizer*, Elektrosvyaz, vol. 45, No. 3, pp. 5–10 (Mach 1990).

Saleh, A.A.M., et al., Dialog Abstract, *An experimental TDMA indoor radio communications systemusing slow frequency hopping and coding*, IEEE Transactions on Communications, vol. 39, No. 1, pp. 152–162 (Jan., 1991).

Nergis, A., Dialog Abstract, *Optimum HF digital communication systems with block coding and interleaving techniques*, Proceedings of the 1990 Bilkent International Conference on New Trends in Communication, Control and Signal Processing, vol. 1, pp. 511–517 (Turkey, Jul. 2–5, 1990).

Kawamata, F., et al., Dialog Abstract, *An evaluation of voice codecs and facsimiles*, Review of the Communications Research Laboratory, vol. 36, pp. 69–73 (Mar. 1990).

Sato, T., et al., Dialog Abstract, *Error–free high–speed data transmission protocol simultaneously applicable to both wire and mobile radio channels*, 38$^{th}$ IEEE Vehicular Technology Conference: 'Telecommunications Freedom—Technology on the Move', pp. 489–496 (Jun. 15–17, 1988).

Dialog Abstract, *1200–bit/s cellular modem DLD03H*, Oki Technical Review, vol. 53, No. 127, pp. 70–72 (Jul. 1987).

Chamberlin, J.W., et al., Dialog Abstract, *Design and field test of a 256–QAM DIV modem*, IEEE Journal on Selected Areas in Communications, vol. SAC–5, No. 3, pp. 349–356 (Apr. 1987).

De Cristofaro, R., et al., Dialog Abstract, *A 120 Bv/s QPSK modem designed for the INTELSAT TDMA network*, International Journal of Satellite Communications, vol. 3, Nos. 1–2, pp. 145–160 (Jan.Jun. 1985).

Shumate, A., Dialog Abstract, *Error correction coding for channels subject to occasional losses of bit count integrity*, IEEE Military Communications Conference, vol. 1, pp. 89–83 (Oct. 21–24, 1984).

Suyderhoud, H., et al., Dialog Abstract, *Investigation of 9.6 kb/s data transmission via a PCM link at 64 kb/s with and without link errors*, International Journal of Satellite Communications, vol. 2, No. 1, pp. 81–87 (Jan.–Mar., 1984).

Smith, C., Dialog Abstract, *Relating the performance of speech processors to the bit error rate*, Speech Technology, vol. 2, No. 1, pp. 41–53 (Sep.–Oct. 1983).

Suyderhoud, H., et al., Dialog Abstract, *Investigation of 9.6–kbit/s data transmission via a PCM link at 64 kbit/s with and without link errors*, Sixth International Conference on Digital Satellite Communications Proceedings, pp. 26–33 (Sep. 19, 23, 1983).

Kittel, L., Dialog Abstract, *Analogue and discrete channel models for signal transmission in mobile radio*, Frequenz,, vol. 36, Nos. 4–5, pp. 153–160 (Apr.–May 1982).

Farrell, P.G., et al., Dialog Abstract, *Soft–decision error control of h.f. data transmission*, IEE Proceedings F (Communications, Radar and Signal Processing), vol. 127, No. 5, pp. 389–400 (Oct. 1980).

Johnson, A.L., Dialog Abstract, *Simulation and implementation of a modulation system for overcoming ionospheric scintillation fading*, AGARD Conference Proceedings No. 173 on Radio Systems and the Ionosphere, pp. 3/1–5 (Greece, May 26–30, 1975).

Matsumura, K., et al., Dialog Abstract, *Anti–interference data–transmission set of HF radio equipment*, Mitsublishi Electric Engineer, No. 41, pp. 18–23 (Sep., 1974).

Blank, H.A., et al., Dialog Abstract, *A Markov error channel model*, 1973 National Telecommunications Conference, vol. 1, pp. 15B/1–8 (Nov. 26–28, 1973).

McGruther, W.G., Dialog Abstract, *Long term error performance data for operation at 2400 bps ona nonswitched private line network*, Summaries of papers presented at 1970 Canadian symposium on communications, pp. 65–66 (Canada, Nov. 12–13, 1970).

Burton, H.O., et al., Dialog Astract, *On the use of error statisitcs from data transmission on telephone facilities to estimate performance of forward–error–correction*, 1970 international conference on communications, p. 21 (Jun. 8–10, 1970).

Bowen, R.R., Dialog Abstract, *Application on burst error correction codes to data modems for dispersive channels*, Proceedings of the 1970 international symposium on information theory, p. 1 (Netherlands, Jun. 15–19, 1970).

Pierce, A.W., et al., Dialog Abstract, *Effective application of forward–acting error–control coding to multichannel h.f. data modems*, IEEE Transactions on Communication Technology, vol. Com–18, No. 4, pp. 281–294 (Aug. 1970).

West, R.L., Abstract, *Data Concentration Method*, IBM Technical Disclosure Bulletin, pp. 487–489; http://w3.infogate.ibm.com:1207/SESS506884/GETDOC/39/2/1, (Jul., 1975).

Haas, L.C., et al., Abstract, *Received Line Signal Quality Analysis*, IBM Technical Disclosure Bulletin, pp. 5414–5416; http://w3.infogate.ibm.com:1207/SESS506884/GETDOC/43/1/1 (May, 1981).

Nussbaumer, H., Abstract, *Reducing the Acquisition Time in an Automatic Equalizer*, IBM Technical Disclosure Bulletin, pp. 1465–1479; http://w3.infogate.ibm.com:1207/SESS506884/GETDOC/40/2/1 (Oct. 1975).

Dialog Abstract, *Listener echo canceller for digital communication system*, PCT No. WO 9310607.

Dialog Abstract, *Reduced time remote access method for modem computer*, PCT No. WO 9209165.

Erup, et al., *Interpolation in Digital Modems—Part II: Implementation and Performance*, IEEE Transactions on Communications, vol. 41, No. 6, pp. 998–1008 (Jun. 1993).
Fischer, *Signal Mapping for PCM Modems, V–pcm Rapporteur Meeting*, Sunriver, Oregon, USA, , 5 pgs. (Sep. 4–12, 1997).
Gardner, *Interpolation in Digital Modems—Part 1: Fundamentals*, IEEE Transactions on Communications, vol. 41, No. 3, pp. 501–507 (Mar. 1993).
Humblet et al., *The Information Driveway*, IEEE Communications Magazine, pp. 64–68 (Dec. 1996).
Kalet et al., *The Capacity of PCM Voiceband Channels*, IEEE International Conference on Communications '93, pp. 507–511 (Geneva, Switzerland, May 23–26, 1993).
Mueller et al., *Timing Recovery in Digital Synchronous Data Receiver*, IEEE Transactions on Communications, vol. Com–24, No. 5, pp. 516–531 (May 1976).
Okubo et al., *Building Block Design of Large Capacity PCM–TDMA Subscriber System and Direct Ditigal Interface to Digital Exchange*, Japan Radio Co., Ltd., pp. 69–73 (Japan).
Pahlavan et al., *Nonlinear Quantization and the Design of Coded and Uncoded Signal Constellations*, IEEE Transactions on Communications, vol. 39, No. 8, pp. 1207–1215 (Aug. 1991).
Proakis, *Digital Signaling Over a Channel with Intersymbol Interference*, Digital Communications, pp. 373, 381 (McGraw–Hill Book Company, 1983).
Williams et al., *Counteracting the Quantisation Noise from PCM Codecs*, BT Laboratories, pp. 24–29 (UK).
*A Digital Modem and Analogue Modem Pair for Use on the Public Switched Telephone Network (PSTN) a Data Signalling Rates of Up to 56 000 Bit/s Downstream and 33 600 Bit/s Upstream*, ITU–T V.90 (Sep. 1998).
*Series V: Data Communication Over the Telephone Network; Interfaces and voiceband modems; A modem operating at data signalling rates of up to 33 600 bit/s for use on the general switched telephone network and on leased point–to–point 2–wire telephone type circuits*, ITU–T V.34 (10/96).
Bell, R.A., et al., *Automatic Speed Reduction and Switched Network Back–up*, IBM Technical Disclosure Bulletin, vol. 32, No. 1, pp. 154–157 (Jun. 1989).
Abbiate, J.C., et al., *Variable–Data Transmission Modem*, IBM Technical Disclosure Bulletin, vol. 17, No. 11, pp. 3301–3302 (Apr. 1975).
*Data Communication Over the Telephone Network; Procedures for Starting Session of Data Transmission Over the General Switched Telephone Network*, ITU–T V.8 (09/94).
*Line Quality Monitoring Method*, IBM Technical Disclosure Bulletin, vol. 18, No. 8, pp. 2726–2726 (Jan. 1976).
*Loopback Tests for V.54 Data Communication Equipment*, IBM Technical Disclosure Bulletin, vol. 32, No. 3A, pp. 295–299 (Aug. 1989).
*On–Line Real Time Modem Testing*, IBM Technical Disclosure Bulletin, vol. 20, No. 6, pp. 2252–2254 (Nov. 1977).

Pierobon, Gianfranco L., *Codes of Zero Spectral Density at Zero Frequency*, IEEE Transactions on Information Theory, vol. IT–30, No. 2, pp. 435–439 (Mar., 1984).
Marcus, Brian H, et al., *On Codes with Spectral Nulls at Rational Submultiples of the Symbol Frequency*, IEEE Transactions on Information Theory, vol. IT–33, No. 4, pp. 557–568 (Jul. 1987).
Fischer, Robert, et al., *Signal Mapping for PCM Modems*, ITU–Telecommunications Standardization Sector PCM '97–120, V.pcm Rapporteur Meeting, (Sunriver, Oregon; Sep. 4–12, 1997).
*Pulse Code Modulation (PCM) of Voice Frequencies*, ITU–T, Recommendation G.711 (Geneva, 1972).
*Data Communication Over the Telephone Network; Error–Correcting Procedures for DCEs Using Asynchronous–to–Synchronous Conversion*, ITU–T V.42 (03/93).
*Improvement to Spectral Shaping Technique*, Research Disclosure, V. 41, n415,415111, pp. 1550–1551 (Nov. 1998).
*TIA Standard Draft: North American Telephone Network Transmission Model for Evaluating Analog Client to Digitally Connected Server Modems*, Telecommunications Industry Association, PN3857,Draft 10 (Feb. 1999).
Davis, Gordon T., *DSP and MATLAB implementation of model–based constellation generation* (Sep. 18, 1998).
Woodruff, K.R, et al, *Automatic and Adaptive System and Efficient Communication in Noisy Communication Line Environments*, IBM Technical Disclosure Bulletin, vol. 24, No. 9, pp. 4627–4629 (Feb. 1982).
Godard, D., et al., *Decision Feedback Equalizer Stabilization in Adaptive Mode*, IBM Technical Disclosure Bulletin, vol. 24, No. 11A, pp. 5691–5692 (Apr. 1982).
Borgnis–Desbordes, P., et al., *Variable–Speed Data Transmission*, IBM Technical Disclosure Bulletin, vol. 27, No. 4A, pp. 2269–2270 (Sep. 1984).
Couland, G., et al., *Analog Wrap Self–Test in Modems During Retrain Operations*, IBM Technical Disclosure Bulletin, vol. 28, No. 6, p. 2457 (Nov. 1985).
Maddens, F., *Sixteen–State Forward Convolutional Encoder*, IBM Technical Disclosure Bulletin, vol. 28, No. 6, pp. 2466–2468 (Nov. 1985).
*Remote Modem–Type Self–Learning*, IBM Technical Disclosure Bulletin, vol. 28, No. 6, pp. 2398–2399 (Nov. 1985).
Maddens, F., *Sixteen–State Feedback Convolutional Encoder*, IBM Technical Disclosure Bulletin, vol. 28, No. 10, pp. 4212–4213 (Mar. 1986).
Nobakht, R.A., *Trellis–Coded Modulation Coding Scheme for a 19/2 Kbps Modem*, IBM Technical Disclosure Bulletin, vol. 36, No. 11, pp. 167–170 (Nov. 1993).
Nobakht, R.A., *Unified Table Based Subset Decoder for the Viterbi Algorithm*, IBM Technical Disclosure Bulletin, vol. 37, No. 09, pp. 581–587 (Sep. 1994).
Novakht, R.A., *Trellis Subset Decoder Algorithm Based on a Pattern Recognition Scheme*, IBM Technical Disclosure Bulletin, vol. 37, No. 10, pp. 693–697 (Oct. 1994).

\* cited by examiner

SYSTEMS, METHODS AND COMPUTER PROGRAM PRODUCTS FOR AVERAGING LEARNED LEVELS IN THE PRESENCE OF DIGITAL IMPAIRMENTS BASED ON PATTERNS

FIELD OF THE INVENTION

The present invention relates generally to the field of digital communications, and, more particularly, to the selection of code points for digital transmission of information.

BACKGROUND OF THE INVENTION

The demand for remote access to information sources and data retrieval, as evidenced by the success of services such as the World Wide Web, is a driving force for high-speed network access technologies. The public switched telephone network (PSTN) offers standard voice services over a 4 kHz bandwidth. Traditional analog modem standards generally assume that both ends of a modem communication session have an analog connection to the PSTN. Because data signals are typically converted from digital to analog when transmitted towards the PSTN and then from analog to digital when received from the PSTN, data rates may be limited to 33.6 kbps as defined in the V.34 Transmission Recommendation developed by the International Telecommunications Union (ITU).

The need for an analog modem may be eliminated, however, by using the basic rate interface (BRI) of the Integrated Services Digital Network (ISDN). A BRI offers end-to-end digital connectivity at an aggregate data rate of 160 kbps, which is comprised of two 64 kbps B channels, a 16 kbps D channel, and a separate maintenance channel. ISDN offers comfortable data rates for Internet access, telecommuting, remote education services, and some forms of video conferencing. ISDN deployment, however, has generally been very slow due to the substantial investment required of network providers for new equipment. Because the ISDN is not very pervasive in the PSTN, the network providers have typically tariffed ISDN services at relatively high rates, which may be ultimately passed on to the ISDN subscribers. In addition to the high service costs, subscribers must generally purchase or lease network termination equipment to access the ISDN.

While most subscribers do not enjoy end-to-end digital connectivity through the PSTN, the PSTN is nevertheless mostly digital. Typically, the only analog portion of the PSTN is the phone line or local loop that connects a subscriber or client modem (e.g., an individual subscriber in a home, office, or hotel) to the telephone company's central office (CO). Local telephone companies have been replacing portions of their original analog networks with digital switching equipment. Nevertheless, the connection between the home and the CO has been the slowest to change to digital as discussed in the foregoing with respect to ISDN BRI service. A recent data transmission recommendation issued by the ITU, known as V.90, takes advantage of the digital conversions that have been made in the PSTN. By viewing the PSTN as a digital network, V.90 technology can accelerate data downstream from the Internet or other information source to a subscriber's computer at data rates of up to 56 kbps, even when the subscriber is connected to the PSTN via an analog local loop.

To understand how the V.90 Recommendation achieves this higher data rate, it may be helpful to briefly review the operation of V.34 analog modems. V.34 modems are generally optimized for a configuration in which both ends of a communication session are connected to the PSTN by analog lines. Even though most of the PSTN is digital, V.34 modems treat the network as if it were entirely analog. Moreover, the V.34 Recommendation assumes that both ends of the communication session suffer impairment due to quantization noise introduced by analog-to-digital converters. That is, the analog signals transmitted from the V.34 modems are sampled at 8000 times per second by a codec upon reaching the PSTN with each sample being represented or quantized by an eight-bit pulse code modulation (PCM) codeword. The codec uses 256, non-uniformly spaced, PCM quantization levels defined according to either the $\mu$-law or A-law companding standard (i.e., the ITU G.711 Recommendation)

Because the analog waveforms are continuous and the binary PCM codewords are discrete, the digits that are sent across the PSTN can only approximate the original analog waveform. The difference between the original analog waveform and the reconstructed quantized waveform is called quantization noise, which limits the modem data rate.

While quantization noise may limit a V.34 communication session to 33.6 kbps, it nevertheless affects only analog-to-digital conversions. The V.90 standard relies on the lack of analog-to-digital conversions in the downstream path, outside of the conversion made at the subscriber's modem to enable transmission at 56 kbps.

The general environment for which the V.90 standard has been developed is depicted in FIG. 1. An Internet Service Provider (ISP) 22 is connected to a subscriber's computer 24 via a V.90 digital server modem 26, through the PSTN 28 via digital trunks (e.g., T1, E1, or ISDN Primary Rate Interface (PRI) connections), through a central office switch 32, and finally through an analog loop to the client's modem 34. The central office switch 32 is drawn outside of the PSTN 28 to better illustrate the connection of the subscriber's computer 24 and modem 34 into the PSTN 28. It should be understood that the central office 32 is, in fact, a part of the PSTN 28. The operation of a communication session between the subscriber 24 and an ISP 22 is best described with reference to the more detailed block diagram of FIG. 2.

Transmission from the server modem 26 to the client modem 34 will be described first. The information to be transmitted is first encoded using only the 256 PCM codewords used by the digital switching and transmission equipment in the PSTN 28. These PCM codewords are transmitted towards the PSTN by the PCM transmitter 36 where they are received by a network codec. The PCM data is then transmitted through the PSTN 28 until reaching the central office 32 to which the client modem 34 is connected. Before transmitting the PCM data to the client modem 34, the data is converted from its current form as either $\mu$-law or A-law companded PCM codewords to pulse amplitude modulated (PAM) voltages by the codec expander (digital-to-analog (D/A) converter) 38. These PAM voltage levels are processed by a central office hybrid 42 where the unidirectional signal received from the codec expander 38 is transmitted towards the client modem 34 as part of a bidirectional signal. A second hybrid 44 at the subscriber's analog telephone connection converts the bidirectional signal back into a pair of unidirectional signals. Finally, the analog signal from the hybrid 44 is converted into digital PAM samples by an analog-to-digital (A/D) converter 46, which are received and decoded by the PAM receiver 48. Note that for transmission to succeed effectively at 56 kbps, there must be only a single digital-to-analog conversion and subsequent analog-to-digital conversion between the server modem 26 and the client modem 34. Recall that analog-to-digital conversions in the PSTN 28 may introduce quantization noise, which may limit the data rate as discussed hereinbefore. The A/D converter 46 at the client modem 34, however, may have a higher resolution than the A/D converters used in the analog portion of the PSTN 28 (e.g., 16 bits versus 8 bits), which results in less quantization noise. Moreover, the PAM receiver 48 needs to be in synchronization with the 8 kHz network clock to properly decode the digital PAM samples.

Transmission from the client modem 34 to the server modem 26 follows the V.34 data transmission standard. That is, the client modem 34 includes a V.34 transmitter 52 and a D/A converter 54 that encode and modulate the digital data to be sent using techniques such as quadrature amplitude modulation (QAM). The hybrid 44 converts the unidirectional signal from the digital-to-analog converter 54 into a bidirectional signal that is transmitted to the central office 32. Once the signal is received at the central office 32, the central office hybrid 42 converts the bidirectional signal into a unidirectional signal that is provided to the central office codec. This unidirectional, analog signal is converted into either $\mu$-law or A-law companded PCM codewords by the codec compressor (A/D converter) 56, which are then transmitted through the PSTN 28 until reaching the server modem 26. The server modem 26 includes a conventional V.34 receiver 58 for demodulating and decoding the data sent by the V.34 transmitter 52 in the client modem 34. Thus, data is transferred from the client modem 34 to the server modem 26 at data rates of up to 33.6 kbps as provided for in the V.34 standard.

The V.90 standard offers increased data rates (e.g., data rates up to 56 kbps) in the downstream direction from a server to a subscriber or client. Upstream communication still takes place at conventional data rates as provided for in the V.34 standard. Nevertheless, this asymmetry may be particularly well suited for Internet access. For example, when accessing the Internet, high bandwidth is most useful when downloading large text, video, and audio files to a subscriber's computer. Using V.90, these data transfers can be made at up to 56 kbps. On the other hand, traffic flow from the subscriber to an ISP consists mainly of keystroke and mouse commands, which are readily handled by the conventional rates provided by V.34.

As described above, the digital portion of the PSTN 28 transmits information using eight-bit PCM codewords at a frequency of 8000 Hz. Thus, it would appear that downstream transmission should take place at 64 kbps rather than 56 kbps as defined by the V.90 standard. While 64 kbps is a theoretical maximum, several factors prevent actual transmission rates from reaching this ideal rate. First, even though the problem of quantization error has been substantially eliminated by using PCM encoding and PAM for transmission, additional noise in the network or at the subscriber premises, such as non-linear distortion and crosstalk, may limit the maximum data rate. Furthermore, the $\mu$-law or A-law companding techniques do not use uniform PAM voltage levels for defining the PCM codewords. The PCM codewords representing very low levels of sound have PAM voltage levels spaced close together. Noisy transmission facilities may prevent these PAM voltage levels from being distinguished from one another thereby causing loss of data. Accordingly, to provide greater separation between the PAM voltages used for transmission, not all of the 256 PCM codewords are used.

It is generally known that, assuming a convolutional coding scheme, such as trellis coding, is not used, the number of symbols required to transmit a certain data rate is given by Equation 1:

$$bps = R_s \log_2 N_s \qquad \text{EQ. 1}$$

where bps is the data rate in bits per second, $R_s$ is the symbol rate, and $N_s$ is the number of symbols in the signaling alphabet or constellation. To transmit at 56 kbps using a symbol rate of 8000, Equation 1 can be rewritten to solve for the number of symbols required as set forth below in Equation 2:

$$N_s = 2^{56000/8000} = 128 \qquad \text{EQ. 2}$$

Thus, the 128 most robust codewords of the 256 available PCM codewords are chosen for transmission as part of the V.90 standard.

The V.90 standard, therefore, provides a framework for transmitting data at rates up to 56 kbps provided the network is capable of supporting the higher rates. The most notable requirement is that there can be at most one digital-to-analog conversion and subsequent analog-to-digital conversion in the path. Nevertheless, other digital impairments, such as robbed bit signaling (RBS) and digital mapping through PADs, which results in attenuated signals, may also inhibit transmission at V.90 rates. Communication channels exhibiting non-linear frequency response characteristics are yet another impediment to transmission at the V.90 rates. Moreover, these other factors may limit conventional V.90 performance to less than the 56 kbps theoretical data rate.

Because digital impairments, such as RBS and PAD, may vary from connection to connection, V.90 provides for learning the levels of the code points for the PCM codewords when a connection is established., For example, in Phase 3 of the V.90 standard, a sequence of PCM levels are sent from the server modem to the client modem. The resulting levels that are received by the client modem are used to help determine the nature of the digital portion of the telephone connection and to select appropriate code points for signal constellations used to transfer data.

During transmission and acquisition of these levels by the client modem, some levels may be corrupted by noise, non-linearities, and other impairments within the network. Large disturbances in the levels acquired by the client modem can significantly detract from the client modem capability to select appropriate code points for its signal constellations, which may lead to sub-optimum connections and possibly failure to connect in some cases.

The digital PSTN transports information using a six symbol framing structure. That is, a frame includes six data frame intervals with each data frame interval holding a single symbol. One mechanism for reducing the impact of corruption of the levels is to average levels from different intervals and then utilize the average in constellation generation. However, because of the presence if digital impairments such as robbed-bit signaling, such averaging may result in further error. Accordingly, a need exists for improvements in reducing the impact of noise, non-linearities and other impairments on constellation generation in a PCM modem.

SUMMARY OF THE INVENTION

In light of the above discussion, it is an object of the present invention to reduce the impact that noise spikes may have on the selection of code points for a modem.

It is another object of the present invention to reduce the impact of noise spikes even in the presence of digital impairments such as robbed bit signaling.

These and other objects, advantages, and features of the present invention may be provided by averaging measured levels from differing frame intervals based on a digital impairment pattern associated with the frame intervals. Measured levels from frame intervals with the same digital impairment pattern may be averaged together and the measured levels replaced with the average. By averaging frame intervals based on a digital impairment pattern, the present invention may reduce the impact of noise by increasing the signal to noise ratio of the levels utilized for constellation generation. The use of the digital impairment patterns for determining which frame intervals to average may reduce the likelihood that digital impairments will corrupt the average by, for example, collapsing measured levels from one code point onto another code point. If the frame intervals have the same digital impairment pattern then it is likely that the differences in the values in the measured levels of the frame intervals are the result of random noise rather than digital impairments and, therefore, may be averaged together to reduce the impact of the random noise.

Such pattern averaging may be provided by methods, systems and computer program products for averaging measured levels of code point sequences from a plurality of frame intervals in the presence of digital impairments by averaging measured values from intervals of the plurality of intervals based on a pattern associated with digital impairments of the intervals and replacing the measured values for the averaged intervals with the average values. In one embodiment of the present invention, the averaging of the measured levels may be carried out by determining respective patterns associated with each of the plurality of frame intervals and averaging measured levels from frame intervals of the plurality of frame intervals having the same pattern.

In a particular embodiment of the present invention, the determination of the respective patterns may be accomplished by determining digital impairments associated with each of the frame intervals so as to provide a pattern of digital impairments for each frame interval. In such a case, the pattern of digital impairments may be a pattern of robbed-bit signaling and digital PADs.

In another embodiment of the present invention, the respective patterns are determined by determining a pattern of clusters and/or skips for each of the frame intervals.

As will be appreciated by those of skill in the art, the present invention may be embodied as methods, systems and/or computer program products.

BRIEF DESCRIPTION OF THE DRAWINGS

Other features of the present invention will be more readily understood from the following detailed description of specific embodiments thereof when read in conjunction with the accompanying drawings, in which.

DETAILED DESCRIPTION OF THE PREFERRED EMBODIMENTS

Figure 1:
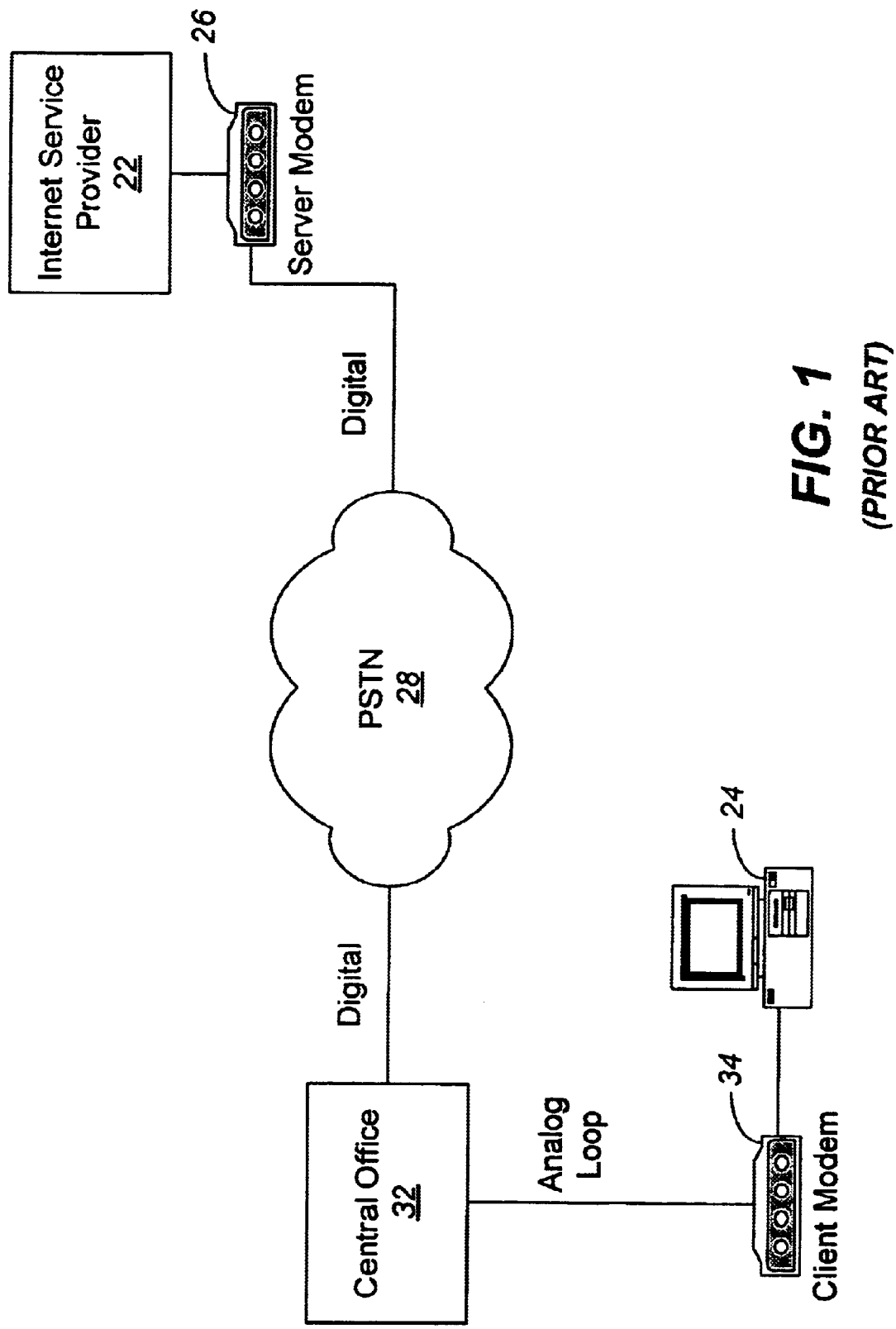
FIG. 1 is a block diagram that illustrates a typical V.90 connection between a subscriber and an ISP in accordance with the prior art.
Figure 2:
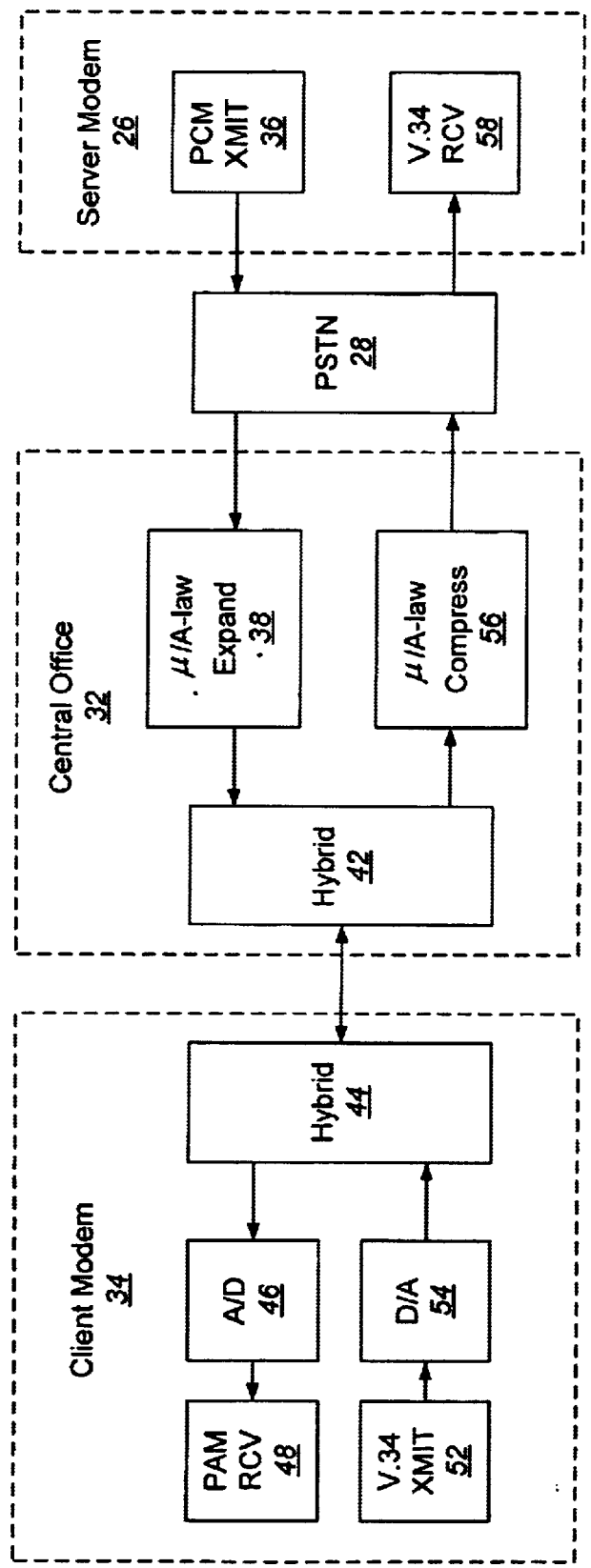
FIG. 2 is a block diagram that illustrates an internal architecture of a client modem, a central office, and a server modem shown in FIG. 1 and connections therebetween.

The present invention will now be described more fully hereinafter with reference to the accompanying drawings, in which preferred embodiments of the invention are shown. This invention may, however, be embodied in different forms and should not be construed as limited to the embodiments set forth herein. Rather, these embodiments are provided so that this disclosure will be thorough and complete, and will fully convey the scope of the invention to those skilled in the art. Like reference numbers signify like elements throughout the description of the figures.

The present invention may be embodied as systems, methods, or computer program products. Accordingly, the present invention may take the form of an entirely hardware embodiment, an entirely software (including firmware, resident software, micro-code, etc.) embodiment, or an embodiment containing both software and hardware aspects. Furthermore, the present invention may take the form of a computer program product on a computer-usable or computer-readable storage medium having computer-usable program code means embodied in the medium for use by or in connection with an instruction execution system. In the context of this document, a computer-usable or computer-readable medium may be any means that can contain, store, communicate, propagate, or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus, device, or propagation medium. More specific examples (a nonexhaustive list) of the computer-readable medium would include the following: an electrical connection having one or more wires, a portable computer diskette, a random access memory (RAM), a read-only memory (ROM), an erasable programmable read-only memory (EPROM or Flash memory), an optical fiber, and a portable compact disc read-only memory (CD-ROM). Note that the computer-usable or computer-readable medium could even be paper or another suitable medium upon which the program is printed, as the program can be electronically captured, via, for instance, optical scanning of the paper or other medium, then compiled, interpreted or otherwise processed in a suitable manner if necessary, and then stored in a computer memory.

Computer program code for carrying out operations of the present invention may be written in a high level programming language such as C or C++. Some modules or routines, however, may be written in assembly language, machine language, or micro-code to optimize speed, memory usage, or layout of the software or firmware in memory. In a preferred embodiment, the present invention uses micro-code to implement most software programs. It should further be understood that the program code for carrying out operations of the present invention may also execute entirely on a client modem, partly on a client modem, partly on a client modem and partly on a server modem, or partly in a client modem, partly in a server modem, and partly in the PSTN. Furthermore, the program code for carrying out the present invention may execute on any processing system capable of performing the operations described herein.

Figure 3:
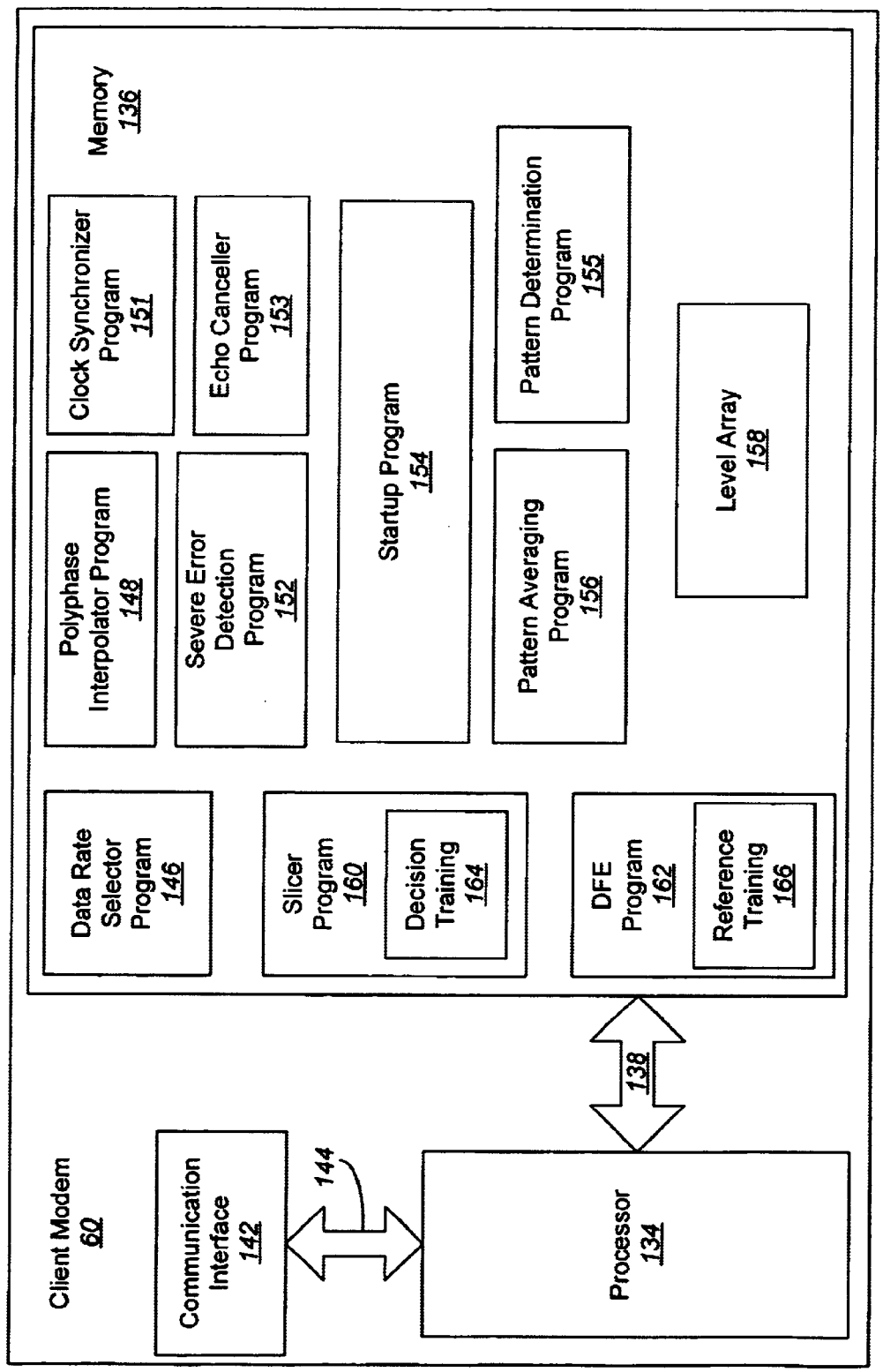
FIG. 3 is a block diagram that illustrates a client modem incorporating proximity averaging according to the present invention.

Referring now to FIG. 3, FIG. 3 illustrates a client modem 60 incorporating averaging based on patterns of the present invention. The client modem 60 includes a processor 134, preferably a digital signal processor, which communicates with a memory 136 via an address/data bus 138. In addition, the processor 134 may receive and transmit information to external devices via a communication interface 142, which is accessed through an input/output (I/O) bus 144. The processor 134 may be any commercially available or custom processor suitable for a real-time intensive embedded application. The memory 136 is representative of the overall hierarchy of memory devices containing the software and data used to implement the functionality of the V.90 client modem 60. The memory 136 may include, but is not limited to, the following types of devices: cache, ROM, PROM, EPROM, EEPROM, flash, SRAM, and DRAM.

As shown in FIG. 3, the memory 136 can include program modules for implementing the functionality of the components of the client modem 60. Preferably, the memory 136 can include a data rate selector program module 146, a polyphase interpolator program module 148, a clock synchronizer program module 151, a severe error detector program module 152, an echo canceller program module 153, a slicer program module 160, and a Decision Feedback Equalizer (DFE) program module 162. The slicer program module 160 and the DFE program module 162 preferably include a decision training program sub-module 164 and a reference training program sub-module 166 respectively, which are used for signaling alphabet identification. Each of these program modules and sub-modules need not be described further herein for a clear understanding of the present invention.

As shown in FIG. 3, the memory 136 includes program modules for implementing the functionality for pattern averaging according to the present invention. That is, the memory 136 preferably includes a modem startup program module 154, a pattern determination program module 155 and a pattern averaging program module 156. Preferably, the client modem 60 also includes a level array 158 of measured, and preferably averaged, PCM code point levels which are generated by the modem startup program module 154. The modem startup program module 154 preferably carries out the startup procedures described in the ITU-T V.90 modem recommendation, including, for example, phases 1 through 4 of the startup procedure. The pattern determination program module 155 and the pattern averaging program module 156 preferably carry out the operations described below with reference to FIG. 4.

As briefly described above, during phase 3 of the V.90 startup procedure, multiple repetitions of each level of the PCM code points for each of 6 framing intervals are transmitted from the server modem to the client modem 60. The client modem acquires these levels and preferably averages multiple repetitions of the acquired levels for each of the 6 framing intervals. Preferably, the PCM code point levels are sent in a manner which avoids levels for adjacent PCM code points being sent consecutive in time so as to reduce the impact of a noise spike as described in commonly assigned and concurrently filed U.S. patent application Ser. No. 09/432,023, entitled SYSTEMS, METHODS AND COMPUTER PROGRAM PRODUCTS FOR FILTERING GLITCHES FROM MEASURED VALUES IN A SEQUENCE OF CODE POINTS, the disclosure of which is incorporated by reference as if set forth fully herein. Also, it is preferred that these PCM code point levels be proximity averaged as described in commonly assigned and concurrently filed U.S. patent application Ser. No. 09/430,603, entitled SYSTEMS, METHODS AND COMPUTER PROGRAM PRODUCTS FOR AVERAGING LEARNED LEVELS IN THE PRESENCE OF ROBBED BIT SIGNALING BASED ON PROXIMITY, the disclosure of which is incorporated by reference as if set forth fully herein. These PCM code point levels may then be processed as described herein to average the measured levels across multiple intervals so as to reduce the impact of noise and other corruption of the levels. An input array containing the measured PCM code point levels is illustrated in FIG. 3 as the level array 158. As will be appreciated by those of skill in the art, the level array 158 may be a plurality of linear arrays or may be a multidimensional array.

The present invention may, for example, be incorporated into modems 60 such as described in U.S. patent application Ser. No. 09/430,694, entitled SYSTEMS, METHODS AND COMPUTER PROGRAM PRODUCTS FOR GENERATING AND OPTIMIZING SIGNAL CONSTELLATIONS, U.S. patent application Ser. No. 09/430,700, entitled SYSTEMS, METHODS AND COMPUTER PROGRAM PRODUCTS FOR CONTROLLING THE ERROR RATE IN A COMMUNICATION DEVICE BY ADJUSTING THE DISTANCE BETWEEN SIGNAL CONSTELLATION POINTS, U.S. patent application Ser. No. 09/430,697, entitled SYSTEMS, METHODS, AND COMPUTER PROGRAM PRODUCTS FOR GENERATING A DIGITAL IMPAIRMENT LEARNING SIGNAL HAVING LOW ENERGY CONTENT AT DIRECT CURRENT AND NYQUIST FREQUENCIES, U.S. patent application Ser. No. 09/430,678, entitled MODEMS HAVING A DUAL POWER MODE CAPABILITY AND METHODS OF OPERATING SAME, and U.S. patent application Ser. No. 09/430,347, entitled SYSTEMS, METHODS, AND COMPUTER PROGRAM PRODUCTS FOR CONTROLLING DATA RATE REDUCTIONS IN A COMMUNICATION DEVICE BY USING A PLURALITY OF FILTERS TO DETECT SHORT-TERM BURSTS OF ERRORS AND LONG-TERM SUSTAINABLE ERRORS, the disclosures of which are incorporated herein by reference as if set forth fully herein.

Figure 4:
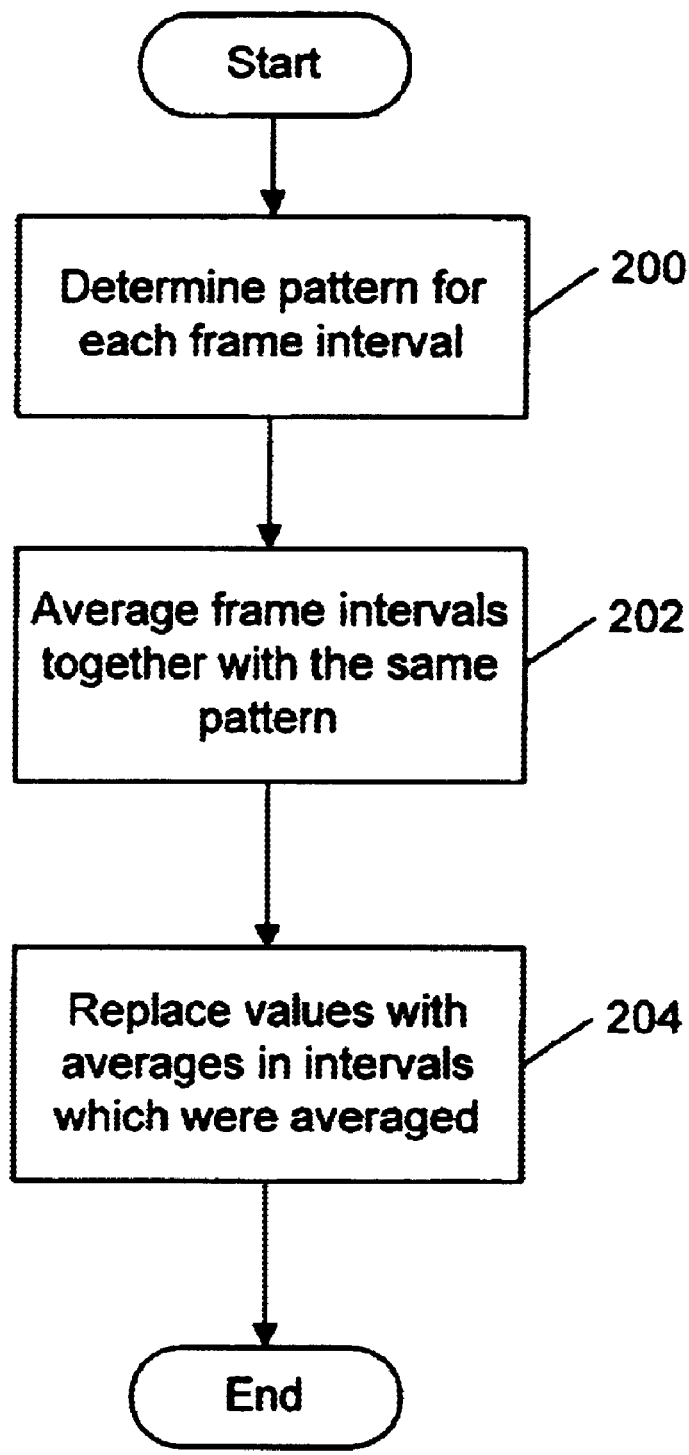
FIG. 4 is a flowchart that illustrates proximity averaging operations in accordance with the present invention.

The pattern averaging program 156 according to the present invention utilizes knowledge of digital impairments such as robbed-bit signaling and digital PADs to determine which frame intervals to include in averages of levels across the framing intervals. Thus, the present invention may take into account the differing digital impairments which may be present in different frame intervals while still allowing for averaging to reduce the impact of noise on the PCM code point levels utilized for constellation generation. The operations of the pattern averaging program module 156 according to a particular embodiment of the present invention are illustrated in FIG. 4 utilizing the above described PCM code point levels as the input array. Preferably, an n by m element array (L(n,m)), where n is the number of code points utilized (i.e. up to 128 for V.90) by the modem 60 and m is the number of framing intervals (e.g. six in a V.90 modem), is provided as the input array to the pattern averaging program module 156. Preferably, the levels in the array are arranged in code point order from lowest to highest code point.

As seen in FIG. 4, operations according to the present invention begin by the pattern determination program module 155 determining a pattern for each of the 6 intervals, which may be used to generate a constellation for each of the 6 frame intervals. The pattern associated with a frame interval may be a pattern of digital impairments, such as a list of identified digital impairments associated with the frame interval (e.g. RBS, tandem PAD, etc.) or it may be a pattern in the measured levels themselves, such as a pattern of clusters and skips in the measured levels, which results from the digital impairments of the frame interval. Apparatus, methods and computer program products for determining the digital impairments of a frame interval and/or a pattern associated with the digital impairments of the frame intervals are described in commonly assigned and concurrently filed U.S. patent application Ser. No. 09/429,862, entitled SYSTEMS, METHODS, AND COMPUTER PROGRAM PRODUCTS FOR IDENTIFYING DIGITAL IMPAIRMENTS IN MODEM SIGNALS USING SIGNATURE ANALYSIS AND SIGNAL LEVEL COMPARISON ANALYSIS, U.S. patent application Ser. No. 09/430,217, entitled SYSTEMS, METHODS AND COMPUTER PROGRAMS PRODUCTS FOR IDENTIFYING DIGITAL IMPAIRMENTS IN MODEMS BASED ON CLUSTERS AND/OR SKIPS IN PULSE CODE MODULATION SIGNAL LEVELS and U.S. patent application Ser. No. 09/429,859, entitled SYSTEMS, METHODS, AND COMPUTER PROGRAM PRODUCTS FOR IDENTIFYING DIGITAL IMPAIRMENTS IN MODEM SIGNALS, the disclosures of which are incorporated herein by reference as if set forth fully herein.

After determining the patterns associated with the frame intervals, as seen in block 202, the measured levels from the level array 158 are averaged by the pattern averaging program module 156. Such an operation may be performed by accessing the level array 158 and averaging together values from differing frame intervals (e.g. the columns in the level array 158) in the level array 158 if the pattern associated with the frame intervals are the same. Thus, in the present example of the level array 158, a row-wise average would be obtained for values in columns with the same pattern. As is further seen in FIG. 4, after the values are averaged the values which were averaged together are replaced by the average (block 204).

Figure 5:
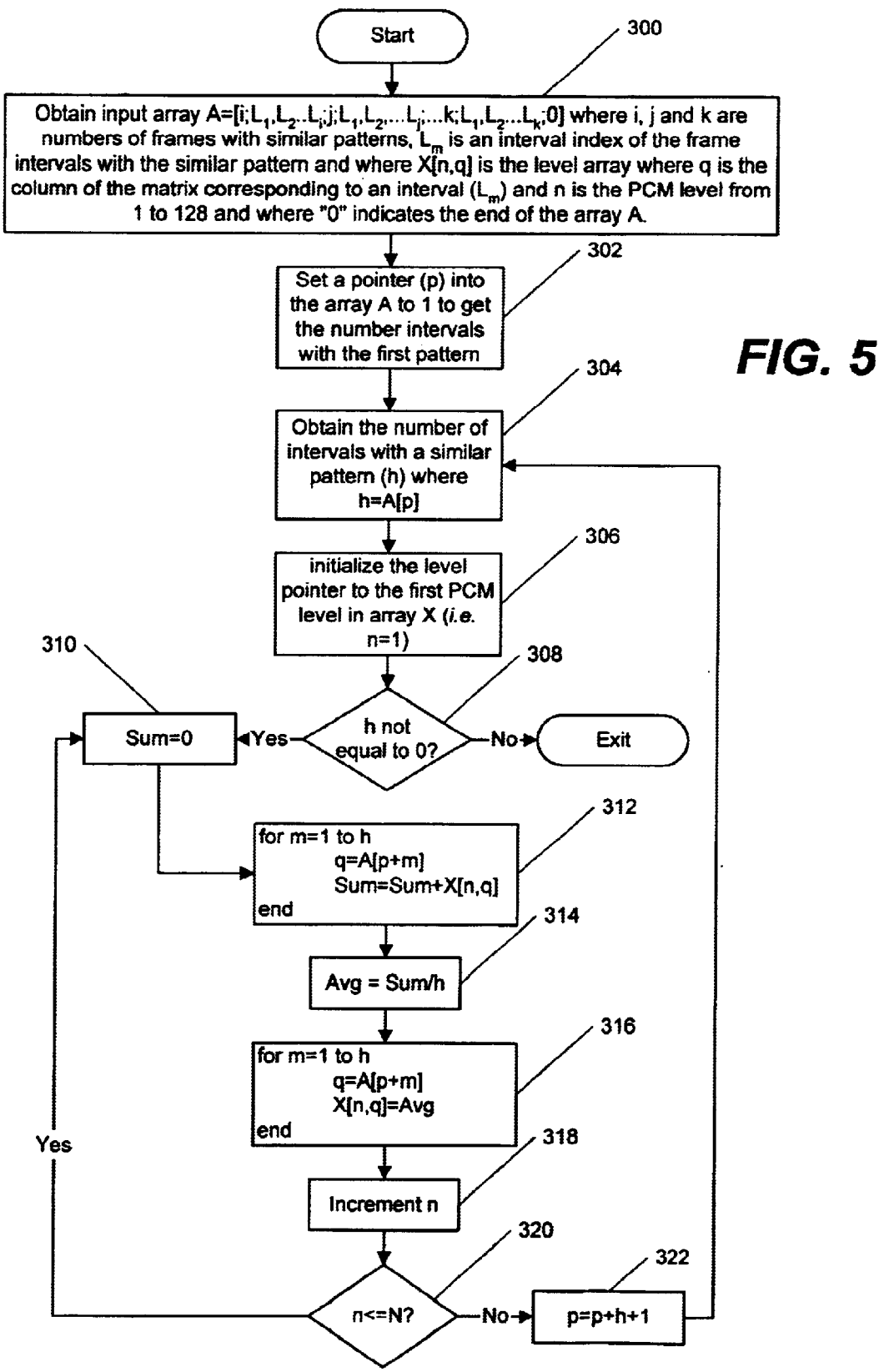
FIG. 5 is a more detailed flowchart of operations for averaging framing intervals according to one embodiment of the present invention.

FIG. 5 illustrates in more detail operations of blocks 202 and 204 according to one embodiment of the present invention. As seen in block 300, an input array is received from the digital impairment determination. As illustrated in FIG. 5, the input array A preferably has the structure of $A[i;L_1, L_2 \ldots L_1;j;L_1,L_2 \ldots L_j; \ldots k;L_1,L_2 \ldots L_k;0]$ where i, j and k reflect the number of frame intervals with a similar pattern. While only three values are indicated because a maximum of three patterns may be present in a 6 frame interval system such as V.90 provides, as will be appreciated by those of skill in the art, if additional frame intervals are present more than three patterns may be present. In any event, the array A also includes an identification of the frame intervals associated with a pattern. These indications of frame intervals are identified as $L_m$ in the array A where m is a number from 1 to i, j or k depending on the pattern. Thus, for example if intervals 1 and 3 have a similar pattern, intervals 2 and 4 have a similar pattern and intervals 5 and 6 have a similar pattern then the array A would be A=[2;1,3;2;2,4;2;5,6;0].

After obtaining the input array A, a pointer p may be initialized to 1 to point to i in the array A (block 302). A number of frame intervals with a similar pattern (h) is then read from the input array A as h=A[p] (block 304). In the present example, h would be set to 2 when p=1. A level pointer (n) is then initialized to the first level in the PCM level array X, where X[n,q] corresponds to a PCM level n for frame interval q (block 306). In the present example, n would be set to 1. It is then determined if h=0. If h=0 then all patterns have been processed and the operations may terminate. If, however, h is not 0, then a sum is initialized to 0 (block 310) and a sum calculated for a level n in the intervals with a similar pattern (block 312). As seen in block 312, this sum may be calculated by incrementing a pointer m from 1 to h, determining the frame interval corresponding to A[p+m] and the adding the value of X[n,A[p+m]] to the sum. Thus, in the present example, the sum for level n would be X[n,1]+X[n,3]. The average would then be determined by dividing the sum by the number of levels in the sum (h)(block 314). The original values in the array X are then replaced by the average as illustrated in block 316. The value of n may then be incremented (block 318) and if n is less than the maximum level (N) (block 320), then the next level is processed.

If the last level in the array X is reached, then the next set of values in array A are evaluated. This is accomplished be setting the pointer p to p+h+1 (block 322) and then restarting processing for the next pattern at block 304. Thus, in the present example, after processing the first pattern corresponding to i, p would be set to 4 as p=1 and h=2 thus, p=1+2+1=4. Therefore, when the operations of block 304 are carried out the fourth element in array A will be evaluated and it determined that j=2. Thus, h will be set to 2 and the averaging operations repeated for the intervals having the pattern corresponding to j. As described above, these operations repeat until a "0" is read from array A as the h value. Thus, for example, if only 2 patterns are present, then k could be set to 0 and the operations terminated after evaluating the first two patterns. Similarly, if one pattern is all that have more than 1 interval, then j could be set to 0 and if no patterns are identified in more than 1 interval then i could be set to 0.

While the present invention has been described with reference to "measured levels" as will be appreciated by those of skill in the art in light of the present invention, the term "measured levels" may encompass any type of PCM code point levels which may be susceptible to noise and, therefore, may benefit from averaging. Accordingly, measured levels includes levels which are directly measured, for example, during a DIL sequence, and levels which are first measured and then processed, such as for example, with the glitch filter or proximity averaging techniques described above. Thus, the term measured level refers to the levels which are used as input for pattern averaging irrespective of how they were obtained.

The present invention has been described herein with reference to flowchart and/or block diagram illustrations of methods, apparatus (systems), and computer program products according to an embodiment of the invention. It will be understood that each block of the flowchart and/or block diagram illustrations, and combinations of blocks in the flowchart and/or block diagram illustrations, may be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions specified in the flowchart and/or block diagram block or blocks.

These computer program instructions may also be stored in a computer-usable or computer-readable memory that can direct a computer or other programmable data processing apparatus to function in a particular manner, such that the instructions stored in the computer-usable or computer-readable memory produce an article of manufacture including instruction means that implement the function specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions that execute on the computer or other programmable apparatus provide steps for implementing the functions specified in the flowchart and/or block diagram block or blocks.

The flowcharts of FIGS. 4 and 5 illustrate the architecture, functionality, and operation of a possible implementation of the client modem receiver software. In this regard, each block represents a module, segment, or portion of code, which comprises one or more executable instructions for implementing the specified logical function(s). It should also be noted that in some alternative implementations, the functions noted in the blocks may occur out of the order noted in the figures. For example, two blocks shown in succession may in fact be executed substantially concurrently or the blocks may sometimes be executed in the reverse order, depending upon the functionality involved.

While the present invention has been illustrated and described in detail in the drawings and foregoing description, it is understood that the embodiments shown are merely exemplary. Moreover, it is understood that many variations and modifications can be made to the embodiments described hereinabove without substantially departing from the principles of the present invention. All such variations and modifications are intended to be included herein within the scope of the present invention, as set forth in the following claims.

What is claimed is:

1. A method of averaging measured levels of code point sequences from a plurality of frame intervals in the presence of digital impairments, the method comprising the steps of:

determining respective patterns associated with each of the plurality of frame intervals;

averaging measured levels from frame intervals of the plurality of frame intervals having the same pattern; and replacing the measured levels for the averaged intervals with the average levels.

2. A method according to claim 1, wherein the step of determining respective patterns comprises the step of determining digital impairments associated with each of the frame intervals so as to provide a pattern of digital impairments for each frame interval.

3. A method according to claim 2, wherein the pattern of digital impairments comprise a pattern of robbed-bit signaling and digital PADs (Packet Assembler/Disassemblers).

4. A method according to claim 1, wherein the step of determining respective patterns comprise the step of determining a pattern of clusters and/or skips for each of the frame intervals.

5. A method according to claim 1, wherein the step of determining respective patterns comprises the step of obtaining an array of values wherein the values in the array indicate a number of frame intervals having a common pattern and the frame intervals having the common pattern.

6. A method according to claim 5, wherein the step of averaging measured levels comprises the steps of;

accessing the array of values to obtain a value of a number of frame intervals having a common pattern;

accessing the array of values to obtain a frame interval identification of the frame intervals having the common pattern;

determining a running sum corresponding to each measured level for the frame interval corresponding to the frame interval identifications;

repeating the steps of accessing the array of values to obtain frame interval identifications and determining the running sum until a number of frame interval identifications has been obtained which corresponds to the value of the number of frame intervals having a common pattern; and determining an average value for each running sum by dividing the running sum for each measured level by the value of the number of frame intervals having a common pattern if the number of frame interval identifications has been obtained which corresponds to the value of the number of frame intervals having a common pattern.

7. A method according to claim 6, wherein the step of replacing the measured levels comprises the steps of replacing the measured levels in the frame intervals corresponding to the frame interval identifications with the corresponding average value.

8. A system for averaging measured levels of code point sequences from a plurality of frame intervals in the presence of digital impairments, comprising:

means for determining respective patterns associated with each of the plurality of frame intervals;

means for averaging measured levels from frame intervals of the plurality of frame intervals having the same pattern; and means for replacing the measured levels for the averaged intervals with the average levels.

9. A system according to claim 8, herein the means for determining respective patterns comprises means for determining digital impairments associated with each of the frame intervals so as to provide a pattern of digital impairments for each frame interval.

10. A system according to claim 9, wherein the pattern of digital impairments comprise a pattern of robbed-bit signaling and digital PADs (Packet Assembler/Disassemblers).

11. A system according to claim 8, wherein the means for determining respective patterns comprise means for determining a pattern of clusters and/or skips for each of the frame intervals.

12. A system according to claim 8, wherein the means for determining respective patterns comprises means for obtaining an array of values, wherein the values in the array indicate a number of frame intervals having a common pattern and the frame intervals having the common pattern.

13. A system according to claim 12, wherein the means for averaging measured levels comprises:

means for accessing the array of values to obtain a value of a number of frame intervals having a common pattern;

means for accessing the array of values to obtain a frame interval identification of the frame intervals having the common pattern;

means for determining a running sum corresponding to each measured level for the frame interval corresponding to the frame interval identifications;

means for repeating accessing the array of values to obtain frame interval identifications and determining the running sum until a number of frame interval identifications has been obtained which corresponds to the value of the number of frame intervals having a common pattern; and means for determining an average value for each running sum by dividing the running sum for each measured level by the value of the number of frame intervals having a common pattern if the number of frame interval identifications has been obtained which corresponds to the value of the number of frame intervals having a common pattern.

14. A system according to claim 13, wherein the means for replacing the measured levels comprises means for replacing the measured levels in the frame intervals corresponding to the frame interval identifications with the corresponding average value.

15. A computer program product for averaging measured levels of code point sequences from a plurality of frame intervals in the presence of digital impairments, comprising:

a computer-readable storage medium having computer readable program code embodied in said medium, said computer-readable program code comprising:

computer-readable program code for determining respective patterns associated with each of the plurality of frame intervals;

computer-readable program code for averaging measured levels from frame intervals of the plurality of frame intervals having the same pattern; and computer-readable program code for replacing the measured levels for the averaged intervals with the average levels.

16. A computer program product according to claim 15, wherein the computer-readable program code for determining respective patterns comprises computer-readable program code for determining digital impairments associated with each of the frame intervals so as to provide a pattern of digital impairments for each frame interval.

17. A computer program product according to claim 16, wherein the pattern of digital impairments comprise a pattern of robbed-bit signaling and digital PADs (Packet Assembler/Disassemblers).

18. A computer program product according to claim 15, wherein the computer-readable program code for determining respective patterns comprise computer-readable program code for determining a pattern of clusters and/or skips for each of the frame intervals.

19. A computer program product according to claim 15, wherein the computer readable program code for determining respective patterns comprises computer readable program code for obtaining an array of values, wherein the values in the array indicate a number of frame intervals having a common pattern and the frame intervals having the common pattern.

20. A computer program product according to claim 19, wherein the computer readable program code for averaging measured levels comprises:

computer readable program code for accessing the array of values to obtain a value of a number of frame intervals having a common pattern;

computer readable program code for accessing the array of values to obtain a frame interval identification of the frame intervals having the common pattern;

computer readable program code for determining a running sum corresponding to each measured level for the frame interval corresponding to the frame interval identifications;

computer readable program code for repeating accessing the array of values to obtain frame interval identifications and determining the running sum until a number of frame interval identifications has been obtained which corresponds to the value of the number of frame intervals having a common pattern; and computer readable program code for determining an average value for each running sum by dividing the running sum for each measured level by the value of the number of frame intervals having a common pattern if the number of frame interval identifications has been obtained which corresponds to the value of the number of frame intervals having a common pattern.

21. A computer program product according to claim 20, wherein the computer readable program code for replacing the measured levels comprises computer readable program code for replacing the measured levels in the frame intervals corresponding to the frame interval identifications with the corresponding average value.

* * * * *